US012168156B2

(12) United States Patent
Hofmann et al.

(10) Patent No.: US 12,168,156 B2
(45) Date of Patent: *Dec. 17, 2024

(54) WATER EXTINGUISHING SYSTEM AND METHOD FOR CONTROLLING A PUMP TEST RUN IN A WATER EXTINGUISHING SYSTEM

(71) Applicant: Minimax Viking Patent Management GmbH, Bad Oldesloe (DE)

(72) Inventors: Klaus Hofmann, Bad Oldesloe (DE); Joachim Böke, Düsseldorf (DE); Frank Friede, Groß Neuleben (DE); Stephan Bludau, Elmenhorst (DE)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,786

(22) Filed: May 17, 2023

(65) Prior Publication Data

US 2023/0364459 A1 Nov. 16, 2023

Related U.S. Application Data

(63) Continuation of application No. 17/090,496, filed on Nov. 5, 2020, now Pat. No. 11,691,042.

(30) Foreign Application Priority Data

Dec. 27, 2019 (DE) ..................... 10 2019 135 815.9

(51) Int. Cl.
*A62C 37/50* (2006.01)
*A62C 35/68* (2006.01)

(52) U.S. Cl.
CPC ............. *A62C 37/50* (2013.01); *A62C 35/68* (2013.01)

(58) Field of Classification Search
CPC .......... A62C 37/50; A62C 35/68; A62C 35/58
See application file for complete search history.

(56) References Cited

U.S. PATENT DOCUMENTS

| | | | |
|---|---|---|---|
| 5,950,150 | A | 9/1999 | Lloyd et al. |
| 8,573,315 | B1 | 11/2013 | Taylor |
| 9,375,595 | B2 | 6/2016 | Murray et al. |

FOREIGN PATENT DOCUMENTS

| | | | |
|---|---|---|---|
| DE | 84 27 006 | U1 | 2/1985 |
| DE | 44 39 882 | C2 | 5/1996 |

(Continued)

OTHER PUBLICATIONS

Search Report (with translation), German Application No. 10 2019 135 815.9, 11 pages (Apr. 22, 2020).

(Continued)

*Primary Examiner* — Peter J Macchiarolo
*Assistant Examiner* — Timothy P Graves
(74) *Attorney, Agent, or Firm* — Perkins Coie LLP

(57) ABSTRACT

The invention relates to a water extinguishing system with a fluid supply for providing an extinguishing fluid, a pump which is configured to pump the extinguishing fluid from the fluid supply into a supply line of a pipe system of the water extinguishing system, a test line which branches off from the supply line of the pipe system and is configured to conduct the extinguishing fluid pumped by the pump away from the pipe system, and a fluid bypass line with a cross section reduced in comparison to the cross section of the test line, where the fluid bypass line is configured to conduct a predefined portion of the extinguishing fluid around an opening element of the test line away from the pipe system, where the water extinguishing system further comprises at least one control device which is configured to determine at least one parameter indicative of the cross-section of the fluid bypass line, and to control the pump test run of the (Continued)

pump on the basis of that parameter. The invention further relates to a corresponding control device and a method for controlling a corresponding pump test run.

17 Claims, 5 Drawing Sheets

(56) References Cited

FOREIGN PATENT DOCUMENTS

| | | | | | |
|---|---|---|---|---|---|
| DE | 10 2005 024 170 | A1 | | 11/2006 | |
| DE | 10 2006 032 648 | B4 | | 9/2007 | |
| DE | 10 2008 050 126 | A1 | | 7/2010 | |
| DE | 10 2018 119 776 | A1 | | 2/2020 | |
| EP | 1 307 266 | B1 | | 3/2006 | |
| EP | 1 972 793 | B1 | | 7/2010 | |
| GB | 2 280 369 | B2 | | 2/1995 | |
| GB | 2280369 | A | * | 2/1995 | ............. A62C 35/15 |
| JP | S5772664 | | | 5/1982 | |
| WO | WO 2020/035385 | | | 2/2020 | |

OTHER PUBLICATIONS

Examination Report (with translation), German Application No. 10 2019 135 815.9, 9 pages (May 15, 2020).
Decision to Grant (with translation), German Application No. 10 2019 135 815.9, 15 pages (Sep. 8, 2020).

* cited by examiner

WATER EXTINGUISHING SYSTEM AND METHOD FOR CONTROLLING A PUMP TEST RUN IN A WATER EXTINGUISHING SYSTEM

PRIORITY CLAIM AND INCORPORATION BY REFERENCE

This application is a continuation of U.S. patent application Ser. No. 17/090,496, filed Nov. 5, 2020 which claims the benefit of German Application No. 10 2019 135 815.9 filed Dec. 27, 2019, each of which application is incorporated by reference in its entirety.

TECHNICAL FIELD

The present invention relates to a water extinguishing system and a method for controlling a pump test run, in particular in a water extinguishing system.

BACKGROUND AND SUMMARY OF THE INVENTION

Water extinguishing systems according to the invention are in particular sprinkler, water spray and foam extinguishing systems, wherein the invention is not limited to special types of water extinguishing systems.

The present invention relates in particular to water extinguishing systems comprising a fluid supply for providing an extinguishing fluid, a pump which is configured to pump the extinguishing fluid from the fluid supply into a supply line of a pipe system of the water extinguishing system, and a test line which branches off from the supply line of the pipe system and is configured to conduct the extinguishing fluid pumped by the pump away from the pipe system. The test line has an opening element which is designed to be movable between a locking position in which the opening element closes the test line and an unlocking position in which the opening element opens the test line. The water extinguishing system further comprises a fluid bypass line which has a reduced cross-section in comparison with the test line, where the fluid bypass line is configured to conduct a predefined portion of the extinguishing fluid around the opening element away from the pipe system.

In this context, the term fluid supply may be understood as referring to a combination of one or more elements which serve to supply the water extinguishing system with extinguishing fluid. For this purpose, the fluid supply may in particular comprise a drinking water supply from which drinking water can be supplied to the water extinguishing system as extinguishing fluid. Alternatively or additionally, the fluid supply may comprise a reservoir in which the extinguishing fluid can be stored.

A test line is understood as referring to a water measuring device comprising a flow meter, stilling pipes and regulating valves for testing the water rate. The test line is preferably provided as a branch line from the supply line to the pipe system of the water extinguishing system, particularly as a branch line from the distribution pipe which is positioned behind the pump and serves to supply the pipe system. A distribution pipe describes in particular a pipe that either directly feeds a branch pipe or a single sprinkler on a branch pipe that is not a tailpipe and is longer than 300 mm. The pipes that serve to supply the pipe system thus form the supply line to the pipe system.

The test line comprises an opening element. In this context, an opening element is understood in particular as a sliding element within an opening unit, such as a valve, which can be operated manually in accordance with the prior art. Opening is effected by moving the sliding element from a locking position into an unlocking position. Opening the opening element in the test line enables a volume flow through the test line, by means of which a pump test run can be carried out. Closing is then effected by moving the sliding element from the unlocking position into the locking position. This interrupts the volume flow through the valve again.

A fluid bypass line is understood to be a further line, which is provided in addition to the test line and may either also branch off from the supply line to the pipe system or from the test line. The fluid bypass line is characterized in that it has a cross-section that is much smaller than that of the test line. In some embodiments, for example, the cross-section of the fluid bypass line corresponds to only 2 to 10% of the cross-section of the test line, in other embodiments even less. Usually, the cross-section of the fluid bypass line is selected to conduct in particular 2% of the flow of the pump. The fluid bypass line is also called emergency line. The fluid bypass line is implemented in such a manner that it conducts the extinguishing fluid pumped by the pump away from the pipe system even if the opening element in the test line is in the locking position. The fluid bypass line thus serves to conduct the extinguishing fluid around the opening element away from the pipe system.

The term extinguishing fluid is thus understood to refer to a fluid which is used to extinguish and/or fight fires. This extinguishing fluid may in particular be extinguishing water provided with or without additives. In some embodiments the extinguishing fluid may contain in particular a foam, an anti-freezing agent or similar. If possible, the additives should be selected so as to be optimal for the respective application of the water extinguishing system. In some embodiments the extinguishing fluid may also be pure extinguishing water. Other extinguishing fluids are also conceivable.

Water extinguishing systems of the type mentioned above are, amongst others, subject to the regulations described in VdS 2212. In particular, paragraph 1.3.4 of VdS 2212 provides for weekly inspections of the water extinguishing system by the system operator. Amongst other things, the weekly tests include a check of the pump start of the pump which is used to pump the extinguishing fluid. For this, a so-called pump test run must be carried out, which must continue until the normal operating parameters of the pump are reached.

In such water extinguishing systems the test line is usually used for this purpose, enabling a pump test to be carried out while preventing the extinguishing fluid from causing weekly flooding of the areas monitored by the water extinguishing system during the weekly required pump test of the pump. This test line can be opened by means of the opening element for the purpose of the pump test run and closed again after the pump test run has been completed. In this way, it is possible to provide a kind of "test circuit" for the period of the pump test run, thus avoiding flooding of the monitored areas.

In some water extinguishing systems, the test line is configured in such a way that it conducts the extinguishing fluid flowing through it back into a storage tank and/or an intermediate tank which is configured as part of the fluid supply. This means that the extinguishing fluid passing through the test line during the pump test run can still be used by the water extinguishing system. In some water extinguishing systems, the extinguishing fluid passing through the test line is also conducted into a waste water tank and/or discharged via a waste water pipe and not stored.

The fluid bypass line can also be configured to conduct the extinguishing fluid flowing through it back into the storage tank and/or an intermediate tank. Alternatively, the fluid bypass line may be configured such that the extinguishing fluid passing through it is conducted into a waste water tank and/or a waste water pipe and/or otherwise discharged from the pipe system and is not available to the fluid supply again.

According to the prior art, the weekly pump test run of the pump is carried out by hand, i.e. manually, by a trained person. For this purpose, first the test line is released by opening the opening element. A starting device is then used to trigger a pump start of the pump. This start may be automatic or performed manually. The starting pressure, which is the pressure at the time the pump is started, is then measured and recorded and the pump test run is carried out until the normal operating parameters of the pump drive motor are reached. The test line is then closed again by means of the opening element and no further extinguishing fluid can enter the test line.

When a test run is carried out, there is a risk that during the test run a fire occurs and the water extinguishing system is triggered. In such a case, the available amount of extinguishing fluid delivered by the pump is reduced by the amount of water flowing through the open or unclosed test line. This indifferent state has so far prevented the labor-intensive weekly inspections from being automated and leads to an increased risk of an improper supply of the water extinguishing system with extinguishing fluid, for example due to human error. In particular, the need to close the test line manually increases the risk as to whether the person responsible for servicing the sprinkler will actually close it.

Against this background, one object of the present invention is to create a solution which enables the pump test run to be carried out automatically, thus reducing the effort required to inspect the water extinguishing system. Furthermore, it is an object of the invention to improve the reliability and efficiency of water extinguishing in a water extinguishing system of the type mentioned initially. It is also an object of the invention to prevent the risk of an undersupply of extinguishing fluid to the water extinguishing system, especially in the event of a fire during a pump test run.

According to the invention this object is achieved by a water extinguishing system of the type mentioned initially, wherein the water extinguishing system comprises at least one control device which is configured to determine at least one parameter indicative of the cross-section of the fluid bypass line and control a pump test run of the pump on the basis of that parameter.

The present invention allows to automate the pump test run. This means that it is no longer only possible to "automatically" perform a pump start for the pump test run, but that the entire pump test run can be carried out without manual intervention. It is thus possible to carry out a pump test run without having to have trained personnel on site.

Instead, a maintenance technician can send a signal, for example via a remote connection, to the pump's control, which ensures that the pump—as is already known from the prior art—is started for example through a pressure drop at the inlet of the pump. According to the invention, the further process can then proceed automatically without the need for a trained person on site. This is due to the fact that according to the present invention, the extinguishing fluid pumped by the pump during the automatic pump test run is conducted via the fluid bypass line and, accordingly, no opening or closing of the opening element is necessary. Since the fluid bypass line has a greatly reduced opening cross-section of usually at least 2% compared with the test line, only a very small portion of the extinguishing fluid is conducted away from the pipe system via the fluid bypass line and would not be available for firefighting purposes in the event of a fire. Since this is only a small portion, efficient firefighting can still be carried out.

The present invention is thus based on the finding that the small amount of extinguishing fluid which can be passed through the fluid bypass line is sufficient to prevent the pump from running dry (and, for example, overheating) during the pump test run.

For this purpose, however, it must be ensured that the fluid bypass line can actually conduct a sufficient amount of extinguishing fluid. Even small deposits in the fluid bypass line can prevent that a sufficient amount of extinguishing fluid is conducted, especially due to its reduced cross-section compared to the test line. Accordingly, the control of the pump test run must be carried out dependent on whether the fluid bypass line can sufficiently conduct the extinguishing fluid pumped by the pump during the pump test run away from the pipe system.

According to the invention, an innovative control device is therefore provided which determines a parameter indicative of the cross-section of the fluid bypass line and controls the pump test run based on that parameter.

In the context of the invention, such a control device may be understood as corresponding to any device quantitatively capable of controlling the pump test run of the pump based on the question whether the cross-section of the fluid bypass line is suitable and sufficient to ensure a sufficient flow of extinguishing fluid during the pump test run, thus preventing the pump from running dry.

In some embodiments the control device may be implemented in particular as a combination of a sensor and a control unit. In this case, the control unit of the control device may be located in particular at or in the vicinity of the pump. The control unit may be provided as a separate unit specifically configured to control the pump test run. In some embodiments the control unit may also be implemented as an additional module of the control for automatic pump start (by reducing the pressure). Alternatively or additionally, according to the present invention the control unit for the pump test run may also be configured as part of a central apparatus of the water extinguishing system and communicate bidirectionally with the pump via a communication unit.

Particularly suitable as sensors for the control device are such sensors which enable the determination of a parameter that allows conclusions to be drawn about the flow volume of the extinguishing fluid through the fluid bypass line per unit of time, and thus about the cross-section of the fluid bypass line. Such sensors may comprise temperature sensors at the pump, especially at the outlet of the pump, since the temperature at the pump is indicative of the amount of extinguishing fluid passing through the fluid bypass line during the pump test run.

Alternatively or additionally, other sensors may also be used to draw conclusions about the state of the pump. For example, a vibration sensor and/or noise sensor may also be fitted to the pump, allowing for the determination of the vibration and/or noise output of the pump during operation. If cavitation/deposits occur in the fluid bypass line, the vibration and/or noise output of the pump changes. The vibration sensor and/or the noise sensor may also detect these changes compared to the values registered during operation without cavitation/deposit and may thus signal the change in the operating state of the pump and indicate that the pump test run should be aborted.

Alternatively or additionally, the sensors may comprise pressure sensors that measure a pressure difference, for example between a first and a second end of the fluid bypass line, or temperature sensors that also measure a temperature and/or a temperature difference, for example at the first and second ends of the fluid bypass line and/or at the inlet and outlet of the pump. For example, a measurement of the temperature and/or temperature difference within the fluid bypass line may enable the detection of a possible freezing of the fluid bypass line and a measurement at the pump may enable the registration of overheating of the pump.

The sensors may also comprise ultrasonic sensors, which are able to detect deposits within the fluid bypass line and thus a reduction in its cross-section. Alternatively or additionally, the sensors may comprise flow sensors that are designed to determine the flow volume passing through the fluid bypass line per unit of time and/or the flow volume difference, for example between a first end and the second end of the fluid bypass line.

The use of additional sensors and/or a combination of the above mentioned sensors is conceivable and advantageous, since this allows for a more precise determination of the condition of the fluid bypass line.

Depending on the type of sensor, the sensor may be arranged directly at the fluid bypass line and/or in the inlet or outlet lines of the fluid bypass line and/or in the vicinity of, at and/or within the pump.

In this case, the one or more sensors of the control device transmit the sensor data to the control device's control unit, which enables the pump operation to be controlled. For this purpose, the control device can evaluate the sensor data and thus determine the parameter indicative of the cross-section of the fluid bypass line. The control can then take place in dependence upon this parameter.

In some embodiments the evaluation may comprise determining whether the flow volume per time/the cross-section of the fluid bypass line is within a specified value range. If this is the case, it may be assumed that the pump is sufficiently supplied with extinguishing fluid. If the flow volume per time/the cross-section falls below a specified threshold value, it can no longer be assumed that the pump can still deliver sufficient extinguishing fluid. In this case, the control device may output a signal that interrupts the pump test run and/or prevents it from being started at all. This can prevent that the pump runs dry during the test run.

Alternatively or additionally, the control device may also be implemented in the form of a switching device, in particular a flow switch, which switches at a specified flow rate (as a parameter indicative of the cross-section). If this flow rate is undershot, the switching device switches from an activation position to a deactivation position. In the deactivation position, the pump is deactivated. For this purpose, the switching device may preferably be in the energetically more favorable state when in the deactivation position, and may be shifted to the energetically less favorable state by the set flow rate. This ensures that the pump operation is interrupted in the event of an energy failure.

It must be ensured, however, that the pump is not deactivated by the switch in the event of fire. This can be achieved by connecting the pump to two circuits, for example, where in the event of fire another switching device, for example a pressure switch within the pipe system, switches to an activation position and keeps the pump activated, even if the switching device for the pump test run switches to the deactivation position.

In some embodiments the fluid bypass line is configured to branch off from the test line or from the supply line of the pipe system.

The fluid bypass line is preferably configured to conduct some of the extinguishing fluid around the opening element of the test line away from the pipe system. In some embodiments the fluid bypass line may branch off from the supply line to the pipe system, for this purpose. This means that the first end of the fluid bypass line branches off, for example, from the distribution pipe behind the pump and thus conducts the extinguishing fluid pumped by the pump during the pump test run away from the pipe system. In some embodiments the second end of the fluid bypass line terminates in a drain. In some embodiments the second end of the fluid bypass line branches off into the fluid supply again. Other embodiments are possible, provided that they allow the extinguishing fluid pumped by the pump during the pump test run to be conducted away from the pipe system.

In some embodiments the fluid bypass line may also be designed in such a way that its first end branches off from the test line—at a position upstream of the opening element—and its second end leads back into the test line—at a position downstream of the opening element. In this case, the extinguishing fluid conducted through the fluid bypass line is first conducted through the test line, and the fluid bypass line serves to conduct the extinguishing fluid pumped during the pump test run around the (closed) opening element. The test line then continues to conduct the extinguishing fluid downstream of the opening element, for example back to the fluid reservoir and/or to a discharge, such as a sewerage network and/or a sewerage tank. In other embodiments, however, the second end of the fluid bypass line may not lead into the test line but separately from it back into the fluid reservoir and/or the discharge.

In some embodiments, controlling the pump test run may comprise comparing a parameter value with a predetermined threshold value, where the control device may be configured to terminate the pump test run if the threshold value is exceeded or not reached and/or to not start the pump test run.

As described above, the control device may be configured in particular to evaluate the parameter indicative of the cross-section and to control the pump test run on the basis of this evaluation.

In some embodiments, the evaluation may particularly comprise the determination of a threshold value for the parameter.

If the parameter is, for example, the flow volume of the extinguishing fluid through the fluid bypass line per time, a threshold value, in particular a minimum value, may be defined for this flow volume. If this minimum value is not reached, it can then be determined that the fluid bypass line can no longer carry enough extinguishing fluid per unit of time to prevent the pump from running dry. In this case, the control device is configured to cancel a pump test run that is already running. Alternatively, if the pump test run has not yet been started, the control device is configured to not start the pump test run at all.

A threshold value may also be specified if the parameter is a pressure difference and/or pressure, in particular a minimum pressure value that must be guaranteed to ensure the pump is not damaged. If this value is undershot, the control device will in this case again cause the abortion of a pump test run in progress or prevent the pump test run from being started at all, if this has not yet occurred.

If the parameter is the temperature, in particular the temperature at the pump outlet, the threshold value may in particular comprise a maximum value for the temperature of the extinguishing fluid which must not be exceeded. If the maximum value is exceeded, the control device then again causes a pump test run in progress to be aborted and/or prevents the same from being started.

The threshold values to be used in the evaluation may be predetermined and may in particular depend on the pump used and/or its pump type and/or pump category. Such specifications may be referenced from the manufacturer specifications, for example. However, they may also be determined individually for each pump on a regular basis. The threshold values may in particular be stored in a memory unit of the control device and/or the central apparatus.

In some embodiments, the control device may be configured to ensure that the water extinguishing system is in a state of operational readiness in the event of an energy failure during the pump test run.

Hereby, the operating state is the state in which the water extinguishing system is in operation, i.e. used to carry out a fire protection action. The control device may be configured to ensure a state of operational readiness, even in the event of an energy failure, in particular a power failure. For this purpose, the control device may comprise an energy storage device, such as a battery, which allows the pump to be controlled even in the event of an energy failure, for example to abort the pump test run to save energy for an event of fire.

In other embodiments in which the control device comprises a switching device, this switching device may be configured in such a way that it is in an energetically more favorable state when in the deactivation position. This means that in the event of an energy failure, the switching device will switch to the deactivation position, thus aborting the pump test run so that the pump is in a state of operational readiness for a possible fire.

In some embodiments, the control device may be configured to ensure that the water extinguishing system is in an operating state in the event of fire during the pump test run.

In this context, an operating state is understood to be the state to which the water extinguishing system switches in the event of fire, i.e. the state in which the water extinguishing system triggers and carries out firefighting.

If the pump test run is automated, it must be ensured that in the event of a fire the pump is not switched off after completion of the pump test run, but continues to run so that the water extinguishing system continues to be supplied with extinguishing fluid. For this purpose, the control device must thus be configured to prevent the pump from being switched off/deactivated after completion of the pump test run in the event of a fire.

For this purpose, the control device is preferably in signal connection with a detection means, such as an alarm valve or a non-return flap with a flow indicator of the water extinguishing system, which is configured to detect a fire event. When these detection means detect a fire event, the control device receives a signal that the pump should continue to operate even after the pump test run is completed. The control device then controls the pump in such a way that the pump operation is not aborted after the test run is completed.

If the control device is designed as a switching arrangement, such provision of an operating state in the event of fire can be achieved in particular by appropriate wiring of the pump. In this case, the pump is controlled through at least two switching arrangements, where one switching arrangement is configured to activate and deactivate the pump for the pump test run and a second switching arrangement, comprising for example an alarm switch and/or a pressure switch, is configured to activate the pump in the event of fire. Thus, if a fire occurs during the pump test run, the first switching arrangement may deactivate the pump test run, but the second switching arrangement ensures that the pump remains activated and pumps the extinguishing fluid for the water extinguishing system to extinguish the fire.

This ensures that even with an automatic pump test run implemented, operational readiness is secured in the event of fire.

In some embodiments, the water extinguishing system may also comprise an input device that is configured to receive an automated input that causes the pump to start a pump test run.

As already described at the beginning, the water extinguishing system may in particular comprise a pump with a control which is configured for a so-called automatic pump start. This automatic pump start means that the pump test run can be started automatically, in particular by entering a corresponding command via an input device.

The advantage of this embodiment is that the pump test run can also be started via a remote connection, such that no maintenance personnel is required on site. In this way, any travel of maintenance personnel—and the associated costs—for the weekly inspections can be avoided. In addition, more pump test runs can be carried out, since one person can carry out several test runs in parallel and collect the corresponding data.

In some embodiments, the control device may comprise at least one flow sensor, where the parameter may indicate a flow volume of the extinguishing fluid through the fluid bypass line per unit of time.

In some embodiments, the control device is designed in particular as a combination of a control unit and a flow sensor and accordingly comprises such a flow sensor. In this case the flow sensor is preferably arranged at the fluid bypass line to measure the flow volume of the extinguishing fluid per unit of time. Due to the small cross-section of the fluid bypass line, a flow sensor is preferred for this purpose, which can measure with very high accuracy, such that irregular deviations can be detected even in the case of small flow volumes. Such a flow sensor may comprise, for example, an electronic flow meter, such as a rotameter. Also preferred are flow sensors, including impellers, dynamic pressure sensors, ultrasonic sensors, gyroscopic flow meters, as well as thermal sensors, which, for example, detect heating caused by cavitation within the fluid bypass line.

In some embodiments the control device may comprise at least one pressure sensor, where the parameter may indicate a differential pressure of the extinguishing fluid through the fluid bypass line.

Alternatively or additionally, in some embodiments the control device may comprise one or more pressure sensors configured to detect a differential pressure of the extinguishing fluid through the fluid bypass line. For this purpose, the pressure sensor can preferably be designed as a differential pressure sensor, which is configured to measure the pressure at at least two positions along the fluid bypass line in order to determine a differential pressure. For this purpose, the at least one pressure sensor for determining the differential pressure may preferably comprise several pressure gauges, which respectively record and transmit the pressure value at their respective positions.

Alternatively or additionally, several independent pressure sensors may be used, which may respectively determine the pressure at a position along the fluid bypass line. In this case, the measurements of several pressure sensors are combined to determine a differential pressure. In some embodiments in particular a first measured value for the pressure at a first end of the fluid bypass line may be determined and a second measured value for the pressure at a second end of the fluid bypass line may be determined in order to determine the pressure drop along the fluid bypass line. Alternatively or additionally, pressure sensors can also be arranged where the test line branches off to the fluid bypass line, such that the differential pressure can be determined at access points to the test line. In some embodiments more than two pressure values may be measured. This can increase the accuracy with which the pressure loss is determined.

The necessary accuracy must also be observed when determining pressure values, since, due to the very small cross-section of the fluid bypass line, pressure changes or pressure losses along the line may also be subject to very small deviations, which may, however, at the same time result in very relevant consequences for the pump test run. The values may in particular be in the range of several mbar, which is why the corresponding accuracy must be ensured. One way to achieve the necessary accuracy would be to equip a pressure sensor with an orifice plate.

In this way, the pressure loss along the entire fluid bypass line may be determined, allowing conclusions to be drawn about the cross-section of the fluid bypass line. For example, a high pressure drop means that the cross-section is insufficient, in particular that it is reduced too much. If this is detected, for example by comparing the value for the parameter representing the pressure difference with a corresponding threshold value, the control device will control the pump to abort the pump test run or to not start it at all.

In some embodiments the control device may comprise at least one noise sensor, where the parameter indicates a noise output of the pump indicative of a state of the pump. In some embodiments, the control device may comprise at least one vibration sensor, where the parameter indicates a vibration state of the pump which is indicative of the state of the pump.

In some embodiments the control device may also comprise a noise sensor, preferably arranged in a manner such that it is able to detect the noise output of the pump. This embodiment is based on the knowledge that in the event of cavitation/deposits within the fluid line conducting the extinguishing fluid, the noise output of the pump changes depending on the extent of the cavitation/deposits. In particular, the noise output of the pump is indicative of the state of the pump. This means that by measuring the noise output of the pump, changes in the state of the pump can be detected. If the pump is no longer able to pump sufficient extinguishing fluid due to cavitation in the fluid bypass line, the noise output of the pump, i.e. in particular the noise level and the noise frequency, changes. Measuring this change allows to determine when the pump must be switched off to avoid running dry.

Alternatively or additionally, a measurement of the oscillations, i.e., the vibration, of the pump by means of a vibration sensor may be used to determine the occurrence of cavitation/deposits within the fluid bypass line and to shut down the pump in case of excessive deposits, which could cause the pump to run dry. This is due to the fact that the vibrations of the pump also change when the amount of extinguishing fluid pumped per unit of time changes. If less extinguishing fluid can be pumped due to cavitation, this leads to a corresponding change in the vibration spectrum of the pump compared to the values registered in the initial state—i.e. without cavitation—which is recorded by the vibration sensor. This allows for conclusions to be drawn about the state of the pump and thus a decision can be made whether a pump test run should be aborted in order to avoid damage to the pump.

In some embodiments the control device may comprise a switching arrangement configured to switch between an activation position and a deactivation position, where the deactivation position represents the energetically more favorable state and is switched when a flow rate falls below a threshold value, and where pump operation is terminated in the deactivation position.

In some embodiments the control device may additionally or alternatively control the pump test run in a quantitative way. For this purpose, the control device may in particular comprise a switching arrangement or be designed as such. This means that the switching arrangement is used instead of a control unit and a sensor. This switching arrangement may in particular be designed as a flow switch which is arranged within the fluid bypass line and is capable of switching between an activation position and a deactivation position. This flow switch is preferably configured such that it moves from the deactivation position to the activation position when a specified flow rate is exceeded, thus controlling the pump test run.

Specifically, this means that initially a pressure drop is registered, for example via a pressure switch at the inlet of the pump being tested, which leads to a pump start of the pump. The pump now starts to pump extinguishing fluid. This increases the flow rate through the fluid bypass line, causing the switching arrangement in the control device to switch from the deactivation position to the activation position. A signal which controls the pump test run is then output in the activation position. If, however, the cross-section of the fluid bypass line is reduced, for example due to cavitation or deposits, to such an extent that a sufficient flow rate of the extinguishing fluid can no longer be achieved, the switching arrangement of the control device does not switch from the deactivation to the activation position and the pump test run is not started. This ensures that the pump test run is only carried out if there is sufficient flow through the fluid bypass line per unit of time (i.e., if there is a sufficient cross-section of the fluid bypass line).

If the flow volume decreases while a pump test run is in progress, for example due to clogging or the like in the fluid bypass line, this also causes a switching of the switching arrangement, namely from the activation to the deactivation position, and the pump test run is aborted. This can prevent damage to the pump.

The pump test run is terminated when the pump has reached its normal operating parameters. In this case, the pressure at the inlet of the pump is normal again, the pressure switch, which was used for the automatic pump start, switches back to the initial position and the pump is deactivated. This leads to a reduction in the flow volume passing through the fluid bypass line per unit of time and thus to a switching of the switching arrangement in the control device to the deactivation position. This (finally) ends the pump test run.

If, on the other hand, a fire event occurs during the pump test run, then the pressure at the pump inlet remains low and the pressure switch at the pump inlet does not switch and the pump continues to pump extinguishing fluid. This also ensures that the flow volume passing through the fluid bypass line per unit of time remains constant and thus that the switching arrangement remains in the activation position. Thus, the control device can ensure that the water extinguishing system switches to the operating state in the event of fire despite a pump test run in progress. Since the fluid bypass line only removes a very small amount of the extinguishing fluid—just enough to prevent damage to the pump during the pump test run—efficient firefighting can be ensured despite these slight reductions in the amount of extinguishing fluid.

In some embodiments the water extinguishing system may further comprise at least one temperature sensor which may be arranged in the vicinity of the pump and may be configured to determine a temperature of the extinguishing fluid, where controlling based on the parameter comprises comparing a temperature value of the temperature of the extinguishing fluid in the vicinity of the pump with a temperature threshold value. In some embodiments the control device may be configured to terminate the pump test run if the temperature threshold value is exceeded.

In some embodiments the water extinguishing system also comprises a temperature sensor which together with the control unit may form the control device. This temperature sensor is preferably located in the vicinity of the pump. "In the vicinity of" is to be understood as the area around the pump and the area inside the pump. In particular, "in the vicinity of" is to be understood as the area at the pump inlet and/or pump outlet. In some embodiments the temperature sensor is arranged in particular at the pump outlet and is configured to measure the temperature of the pump directly or to determine it indirectly by measuring the temperature of the extinguishing fluid pumped by and exiting from the pump.

The temperature value determined in this way can then be compared with a corresponding threshold value for evaluation. In particular, this threshold value can be a maximum value for a temperature of the pump and/or of the extinguishing fluid pumped by the pump, i.e. a corresponding temperature threshold value. If this maximum value is exceeded, it can be assumed that the pump would overheat if the pump test run continues. Therefore, the control device is preferably configured to abort the pump test run in such a case. The control device is configured to not start the pump test run at all if, prior to the start of the pump, it is registered that the temperature threshold value is already exceeded.

In some embodiments the temperature sensor could also be arranged inside the pump and measure the pump temperature from there. In this case, as well, the control could be based on a temperature threshold value comparison. In any case, the temperature threshold value must be selected in dependence on the particular pump and/or the particular type of pump and/or the particular extinguishing fluid, based on which temperature is determined and based on the position at which the temperature is determined.

An advantage of this embodiment is that the evaluation of whether the pump test run should be started/continued is carried out directly by considering the pump or the area of the pump. This may potentially help to better assess the state of the pump.

In some embodiments the cross-section of the fluid bypass line branching off from the test line may be reduced by a value of more than 90%, preferably more than 95%, even more preferably more than 98% compared with the test line. This means that the cross-section of the fluid bypass line is thus about 10% or less, preferably less than 5%, even more preferably about 2% or less of the cross-section of the test line. In common water extinguishing systems, the cross-section of the fluid bypass line will be about 2% of the cross-section of the test line.

A further aspect of the invention relates to a control device for use in a water extinguishing system according to at least one of the above-described embodiments, where the control device is configured to determine at least one parameter indicative of a cross-section of a fluid bypass line and to control a pump test run of the pump on the basis of that parameter.

Yet another aspect of the invention relates to a hazard reporting center, in particular a fire reporting and/or extinguishing control center, for a water extinguishing system according to one of the embodiments described above.

A further aspect of the invention relates to a method for controlling a pump test run, in particular in a water extinguishing system according to one of the above-described embodiments, where the method comprises the following steps: Providing a fluid bypass line having a reduced cross-section compared with a test line branching off from a supply line of the pipe system, where the fluid bypass line is configured to conduct a predefined portion of the extinguishing fluid around an opening element of the test line away from the pipe system, determining at least one parameter indicative of the cross-section of the fluid bypass line, and controlling the pump test run of the pump on the basis of that parameter. In some embodiments the method may also comprise: Arranging a temperature sensor in the vicinity of the pump, and determining the parameter, where the parameter is indicative of a temperature of the extinguishing fluid in the vicinity of the pump.

Another further aspect of the invention relates to the use of a fluid bypass line in a water extinguishing system, in particular a water extinguishing system according to one of the above-described embodiments, for a pump test run of a pump, where the fluid bypass line has a reduced cross-section in comparison with a test line branching off from a supply line of the water extinguishing system and comprising an opening element, which is configured to be movable between a locking position, in which the opening element closes the test line, and an unlocking position, in which the opening element opens the test line, and where said fluid bypass line is configured to conduct a predefined portion of the extinguishing fluid around the opening element away from a pipe system of the water extinguishing system.

Although the preferred embodiments of the invention have been explained above in relation to the aspect of the water extinguishing system, these preferred embodiments are equally preferred embodiments of the other aspects mentioned above.

BRIEF DESCRIPTION OF THE DRAWINGS

The invention is described in more detail below with reference to the attached figures and using preferred embodiment examples. The figures show.

MODE(S) FOR CARRYING OUT THE INVENTION

Figure 1:
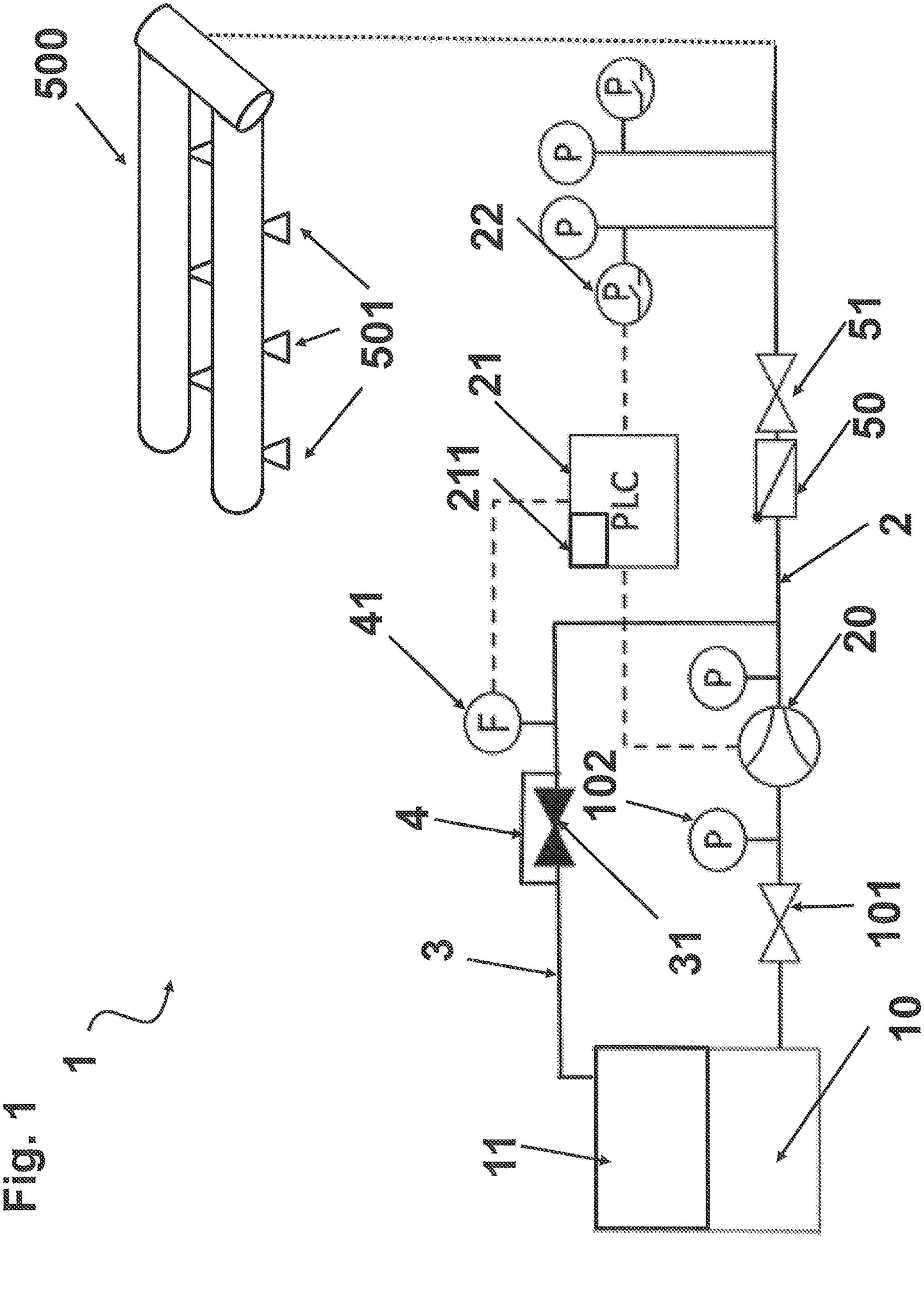
FIG. 1 is a schematic diagram of a water extinguishing system according to a preferred embodiment.

FIG. 1 shows a water extinguishing system 1 according to a preferred embodiment of the invention. In this embodiment, the water extinguishing system 1 is a sprinkler system comprising a plurality of sprinklers 501, which are supplied with extinguishing fluid via a pipe system 500.

The extinguishing fluid is provided by a fluid supply, which in the exemplary embodiment of FIG. 1 is designed as fluid supply tank 10. The fluid supply tank 10 is connected to the pipe system 500 via a supply line 2 in order to supply the pipe system 500 with extinguishing fluid.

The supply line 2 is preferably implemented as a pipe in which a shut-off valve 101, a pressure indicator 102, a pump 20, a non-return valve 50 and a shut-off valve 51 are arranged. The pump 20 is used in this case to pump the extinguishing fluid from the fluid supply tank 10. In this embodiment, the pump 20 is designed as a sprinkler pump.

A test line 3 branches off from the supply line 2 and comprises a shut-off element 31. In accordance with the prior art, this test line 3 was used to carry out a pump test run by moving the opening element 31 from a locking position to an unlocking position to open a test circuit.

The test line 3 according to FIG. 1 is configured to conduct the extinguishing fluid pumped by the pump 20 into a fluid reservoir 11. In the specific embodiment of FIG. 1, this fluid reservoir is connected to the fluid supply tank 10 in fluid communication, such that the extinguishing fluid is conducted back to the fluid supply. In other embodiments, however, the test line 3 may also be configured in such a way that the extinguishing fluid conducted through it is lost to the extinguishing circuit by being conducted into a discharge.

In the locking position of the opening element 31, the opening element 31 is positioned such that no fluid can flow through the test line 3. However, a fluid bypass line 4 branches off from the test line 3, which in the embodiment of FIG. 1 has a cross-section that is 98% reduced in comparison with the test line 3, i.e. has only about 2% of the cross-section of test line 3. This fluid bypass line 4 allows a small portion of the extinguishing fluid to flow around the opening element and thus to end up in the fluid reservoir 11.

In the specific embodiment of FIG. 1, the fluid bypass line 4 branches off from the test line 3. In other embodiments, however, the fluid bypass line can alternatively or additionally also branch off from the supply line 2, as long as it allows some of the extinguishing fluid to be conducted around the opening element when the extinguishing fluid is pumped by the pump 20.

The water extinguishing system 1 as shown in FIG. 1 further comprises a pump control 21 with a pressure switch 22. The pump control 21 is used to start the pump 20. If a pump test run is to be carried out, it is started in accordance with FIG. 1 by reducing the pressure detected by pressure switch 22. This pressure drop causes the pressure switch 22 to switch, thereby activating the pump control 21 and thus the pump 20. The pump 20 now starts to operate, thus pumping extinguishing fluid. Since the shut-off valve 51 to the pipe system is closed, the extinguishing fluid is conducted through the test line 3, where it is conducted via the fluid bypass line 4.

In the specific embodiment of FIG. 1, the pump control 21 comprises a module which comprises the control unit 211. The control unit 211 is in communicative signal connection with the flow sensor 41, which is arranged at the test line 3. In the specific embodiment of FIG. 1, the flow sensor 41 and the control unit 211 form the control device for controlling the pump test run.

The flow sensor 41 is configured to determine the flow volume per unit of time of the extinguishing fluid pumped by the pump 20 and thus to determine a parameter indicative of the cross-section of the fluid bypass line 4. The value of this parameter is then evaluated by the control unit 211. Based on this evaluation, the control unit 211 controls the pump test run of the pump 20. In particular, the control unit determines whether the pump test run should be aborted because of faults that could damage the pump, or whether the pump test run should not be started at all because of such faults, or whether the pump test run can be carried out as planned. In the latter case, the control unit deactivates the pump 20 once the pump test run has been successfully completed, i.e. once the operating parameters of the pump 20 have been reached.

In the embodiment of FIG. 1, the pump test run is thus controlled by a control device comprising a control unit 211 and a flow sensor, where the parameter indicative of the cross-section of the fluid bypass line 4 is a flow parameter. The extinguishing fluid pumped by the pump 20 during the pump test run is discharged via the fluid bypass line 4, which in this manner prevents damage to the pump.

The water extinguishing system 1 of FIG. 1 thus enables an automatic pump test run in which, even in the event of fire or energy failure, it can be ensured that, on the one hand, the water extinguishing system 1 provides sufficient extinguishing fluid for firefighting and that, on the other hand, the pump 20 is controlled in such a way that it remains active in the event of fire, even if the pump test run has been completed.

Figure 2:
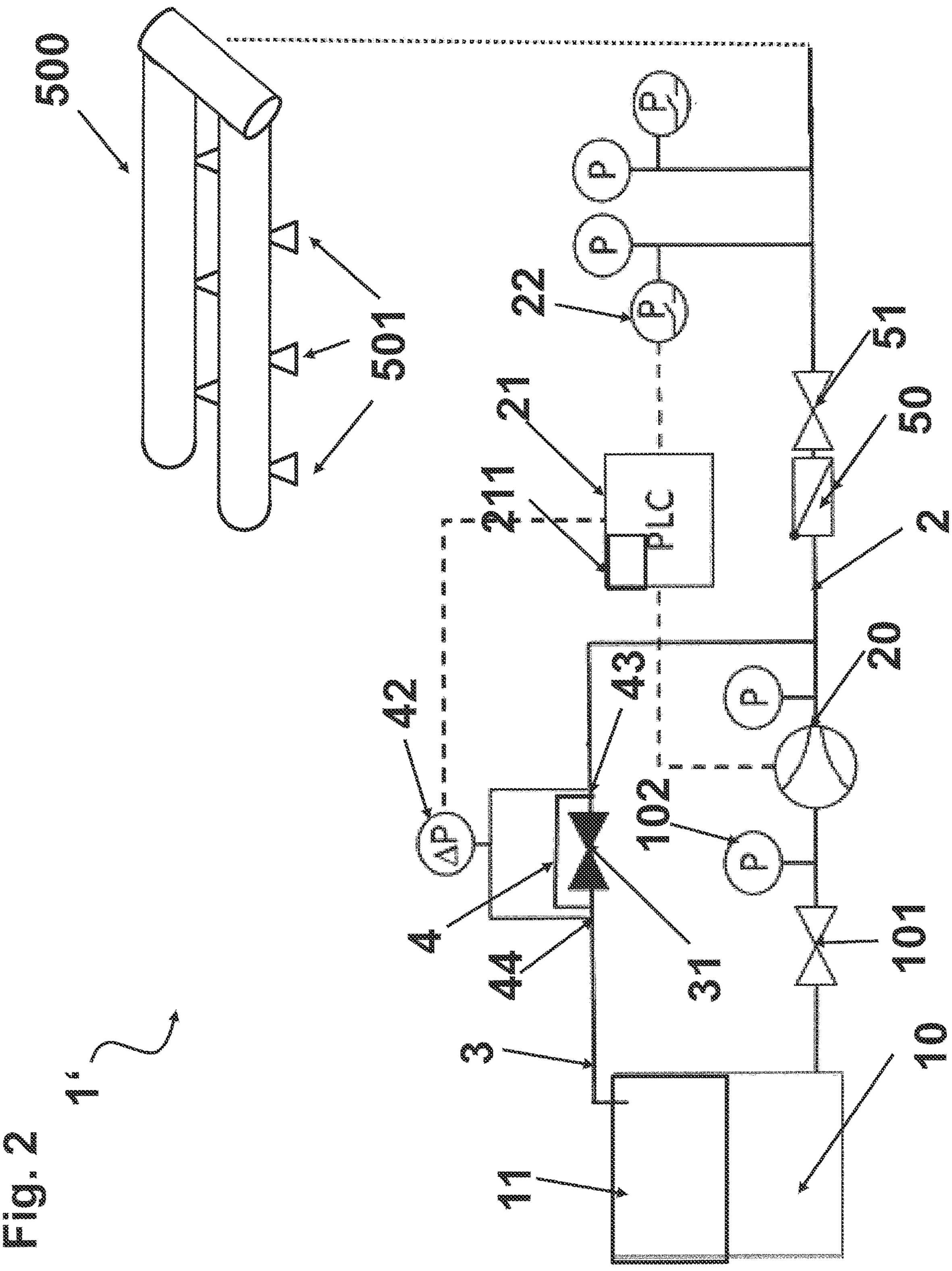
FIG. 2 is a schematic diagram of a water extinguishing system according to another preferred embodiment.

FIG. 2 shows a water extinguishing system 1' according to another preferred embodiment of the invention. The embodiment of FIG. 2 is in many respects similar to the embodiment of FIG. 1, and identical components are designated with identical reference numbers. The water extinguishing system 1' also comprises a fluid supply tank 10, a fluid reservoir 11, a supply line 2 to a pipe system 500 with a shut-off valve 101, a pressure indicator 102, a pump 20, a non-return valve 50 and a second shut-off valve 51. In the embodiment of FIG. 2 the pump 20 also is controlled by the pump control 21 which comprises the control unit 211 and is connected to the pressure switch 22. The functionalities of these elements correspond to those of the embodiment of FIG. 1, which is why no further description is given here.

The water extinguishing system 1' of FIG. 2 is also configured for an automatic pump test run, which, as described in relation to FIG. 1, is started by the pump control 21 by means of the pressure switch 22. In the embodiment of FIG. 2, the water extinguishing system 1' also comprises a test line 3 with an opening element 31 and a fluid bypass line 4. However, in the embodiment of FIG. 2, no flow sensor 41 is arranged at the test line. Instead, the water extinguishing system 1' comprises a pressure difference sensor 42 which is configured to determine a first pressure value at a first position 43 at a first end of the fluid bypass line 4, more precisely where the fluid bypass line 4 branches off from the test line 3, and to determine a second pressure value at a second position 44 at a second end of the fluid bypass line 4, more precisely where the fluid bypass line 4 branches off to the test line 3. The pressure difference sensor 42 thus allows for the determination of the pressure difference between a position at the beginning of the fluid bypass line 4 and a position at the end of the fluid bypass line 4. This enables the measurement of a pressure loss of the extinguishing fluid along the fluid bypass line 4. This in turn allows for conclusions to be drawn about the properties of the cross-section of the fluid bypass line 4.

For this purpose, the pressure difference is transmitted from the pressure difference sensor 42 to the control unit 211 in the pump control 21. The control unit 211 evaluates the determined pressure difference and thus determines whether the cross-section of the fluid bypass line is sufficient to reliably conduct the extinguishing fluid pumped by the pump 20 during the pump test run away from this pump and thus prevent damage to the pump 20.

For this purpose, the control unit 211 is preferably configured to compare the value of the pressure difference with a previously defined threshold value. This threshold value may in particular indicate a maximum value for the pressure difference. If the value of the pressure difference exceeds this maximum value, this indicates that the cross-section of the fluid bypass line 4 is insufficient to prevent damage to the pump.

Should the evaluation show that this is the case, the control unit 211 is configured to output a signal that aborts the pump test run. If the pump test run has not yet been started, this signal may also have the effect that the pump cannot be started at all.

However, if the evaluation shows that the maximum value is not being exceeded, the pump test run can be carried out until the operating parameters of the pump 20 are reached, at which time it is terminated regularly by the control unit 211 of the control device.

Figure 3:
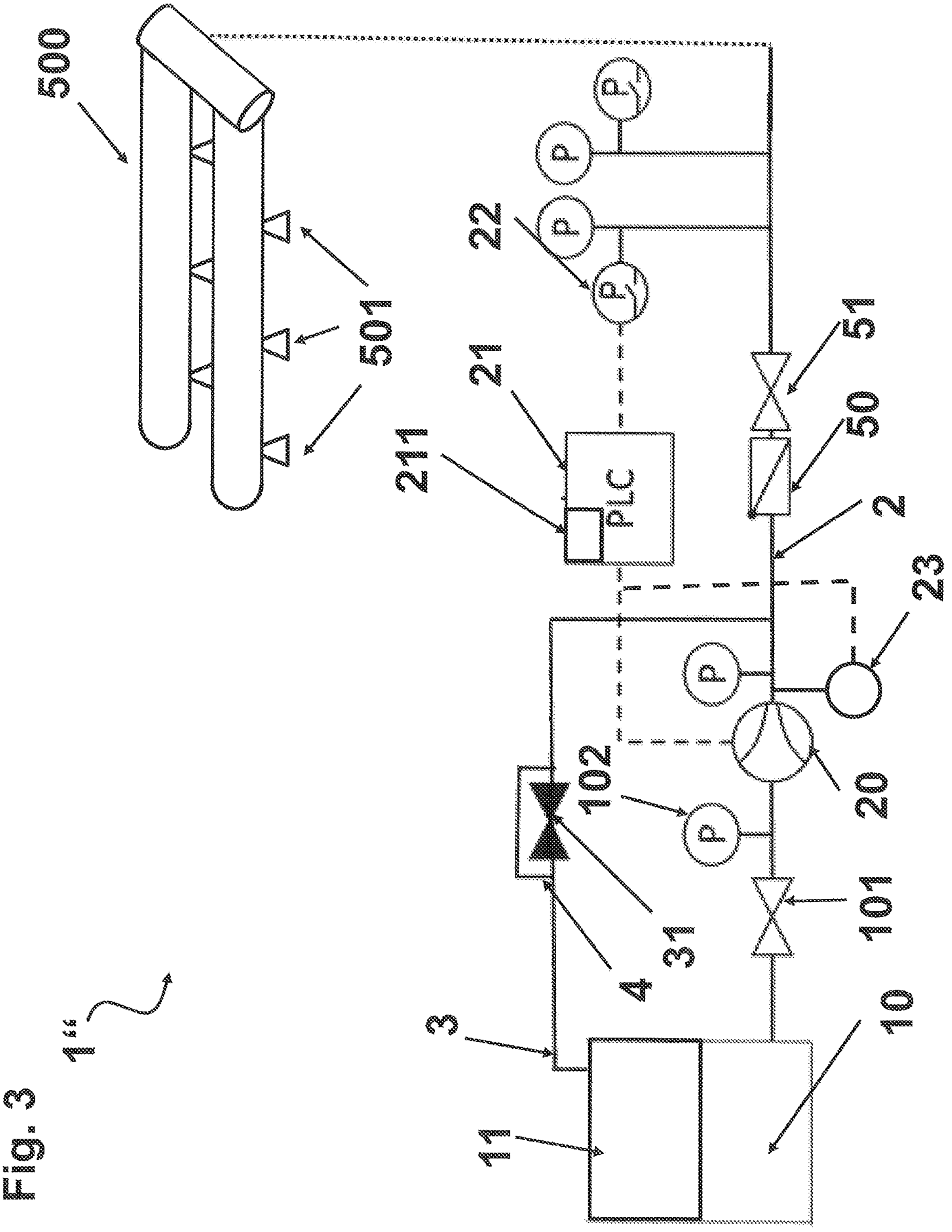
FIG. 3 is a schematic diagram of a water extinguishing system according to yet another preferred embodiment.

FIG. 3 shows a water extinguishing system 1" according to another preferred embodiment. Here again, identical elements are designated with identical reference numbers. This means that the water extinguishing system 1" also comprises a fluid supply tank 10, a fluid reservoir 11, a supply line 2 to a pipe system 500 with a first shut-off valve 101, a pressure indicator 102, a pump 20, a non-return valve 50 and a second shut-off valve 51. In the embodiment of FIG. 3 the pump 20 also is controlled by the pump control 21, which comprises the control unit 211 and is connected to the pressure switch 22.

In contrast to the embodiments of FIGS. 1 and 2, however, in the water extinguishing system 1" of FIG. 3, no measurement of the pressure or flow rate is carried out at the test line 3 or the fluid bypass line 4. Instead, the water extinguishing system 1" comprises a temperature sensor 23, which is in communicative signal connection with the control unit 211 and together with it forms the control device for controlling the pump test run.

In this case, the temperature sensor 23 is arranged at an outlet of the pump 20 and is configured to determine the temperature of the extinguishing fluid that has been pumped through the pump 20. This allows for the indirect determination of the temperature of the pump 20 and thus the determination whether or not the flow of the extinguishing fluid pumped by the pump 20 is sufficient to protect it from running dry and/or overheating—and thereby from damage. Although in the specific embodiment of FIG. 3 a temperature sensor 23 is used to detect possible damage to the pump 20, it should be understood that, alternatively or additionally, a noise sensor and/or a vibration sensor may be used to monitor the state of the pump. Such a noise sensor and/or a vibration sensor would also be arranged similar to the temperature sensor. Preferably a noise and/or vibration sensor may also be mounted directly at the pump casing.

For this purpose, the temperature measured in this way is transmitted to the control unit 211. The control unit 211 is configured to compare the temperature with a temperature threshold value. If this temperature threshold value is exceeded, it means that the extinguishing fluid—and thus also the pump 20—has become too warm. If this is the case, the control unit 211 outputs a signal that aborts a pump test run that has already started or prevents a pump test run from being started. However, if the temperature is below the temperature threshold value, the control unit 211 allows the pump test run to continue until the operating parameters of the pump are reached and only then outputs a signal to terminate the pump test run.

Figure 4:
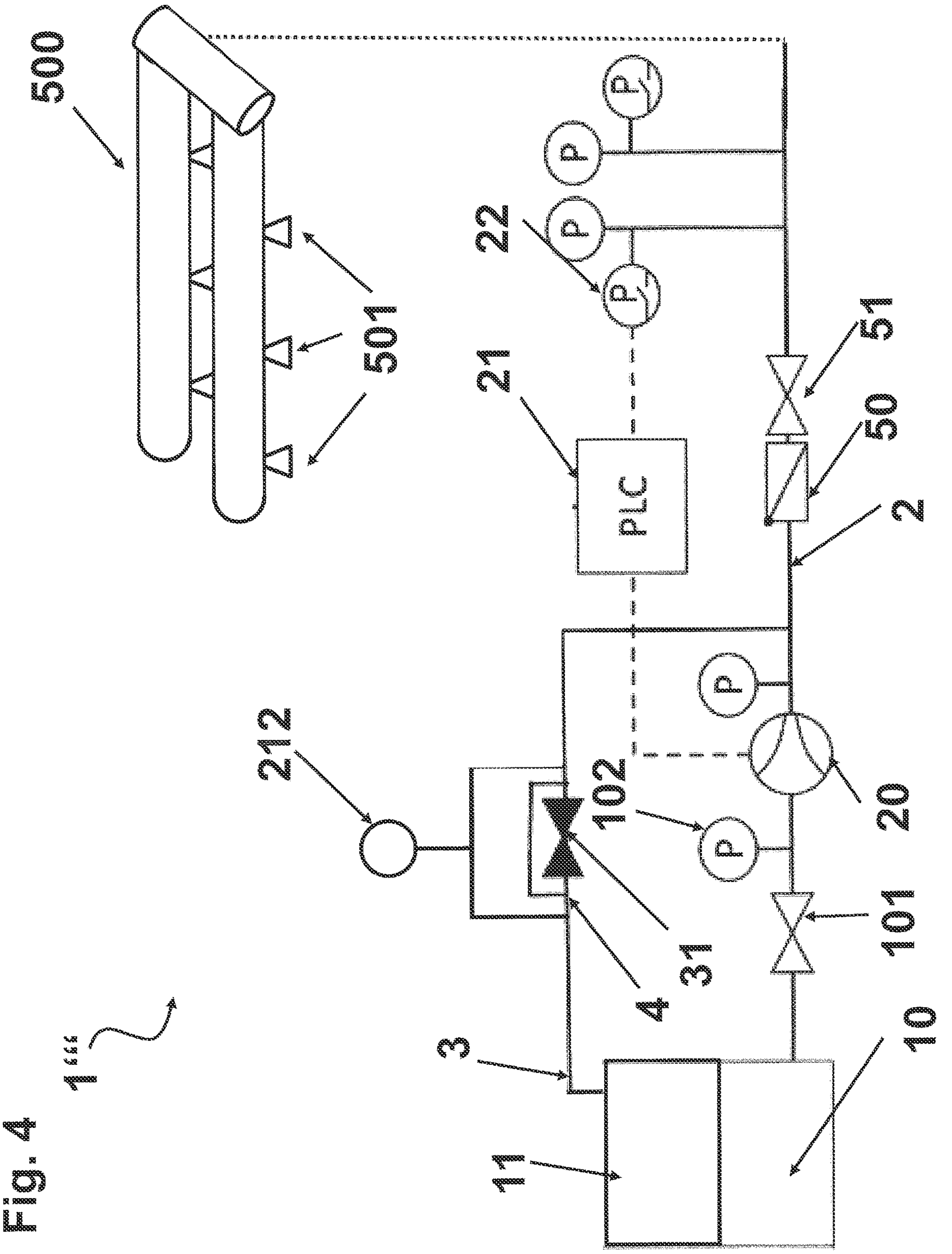
FIG. 4 is a schematic diagram of a water extinguishing system according to yet another embodiment.

FIG. 4 shows a water extinguishing system 1''' according to yet another preferred embodiment with a supply line 2, a test line 3, a fluid bypass line 4, a pump 20, a pipe system 500, a fluid supply tank 10 and a fluid reservoir 11, as described above. Again, identical elements are designated with identical reference numbers. This means that also in the water extinguishing system 1''' a first shut-off valve 101, a pressure indicator 102, a non-return valve 50 and a second shut-off valve 51 are arranged along supply line 2 and the pump 20 is activated by a pump control 21 with a pressure switch 22.

In contrast to the previous embodiments, however, in the embodiment of FIG. 4, the control device is no longer designed as a combination of a control unit 211 and a sensor, but rather as a switching arrangement 212, which is arranged at the fluid bypass line 4 and comprises a flow switch which is configured to switch from a deactivation position to an activation position at a specified flow volume of the extinguishing fluid through the fluid bypass line 4. If the pump is started with the pump control 21 by means of the pressure switch, as described in connection with FIG. 1, the extinguishing fluid flows through the fluid bypass line 4 with a specified amount of extinguishing fluid per unit of time. The pressure switch in the switching arrangement 212 is configured in such a way that it switches to the activation position if a specified amount of extinguishing fluid per unit of time is exceeded. In the activation position, the switching arrangement 212 causes the pump test run of the pump 20 to continue.

However, if the flow volume per unit of time is too low, for example due to cavitation and/or deposits in the fluid bypass line 4, the switching arrangement 212 either does not switch to the activation position in the first place or switches back to the deactivation position, whereby the pump test run of the pump 20 is either not started at all or is aborted. In this way, the switching arrangement 212 prevents damage to the pump caused by an insufficient extinguishing fluid line.

However, if the flow volume of the extinguishing fluid per unit of time is sufficient for the entire pump test run, no such switching of the switching arrangement 212 takes place. In this case, the pump 20 can reach its operating parameters and the pump test run is terminated regularly. The pump 20 then switches off and the flow volume through the fluid bypass line 4 per unit of time is reduced. This switches the switching arrangement 212, i.e. the flow switch changes from the activation position to the deactivation position, and thus also sends a deactivation signal for the pump test run.

However, if a fire occurs during the pump test run, the flow volume per unit of time is not reduced by the continuously open fluid bypass line 4 as long as extinguishing fluid is still available, since the pump 20 continues to operate. In this case, the flow switch of the switching arrangement 212 remains in the activation position. This ensures that the pump is not switched off after the (supposed) completion of the pump test run, but continues to pump extinguishing fluid to fight the fire. This arrangement thus makes it possible to ensure operational readiness in the event of fire.

Figure 5:
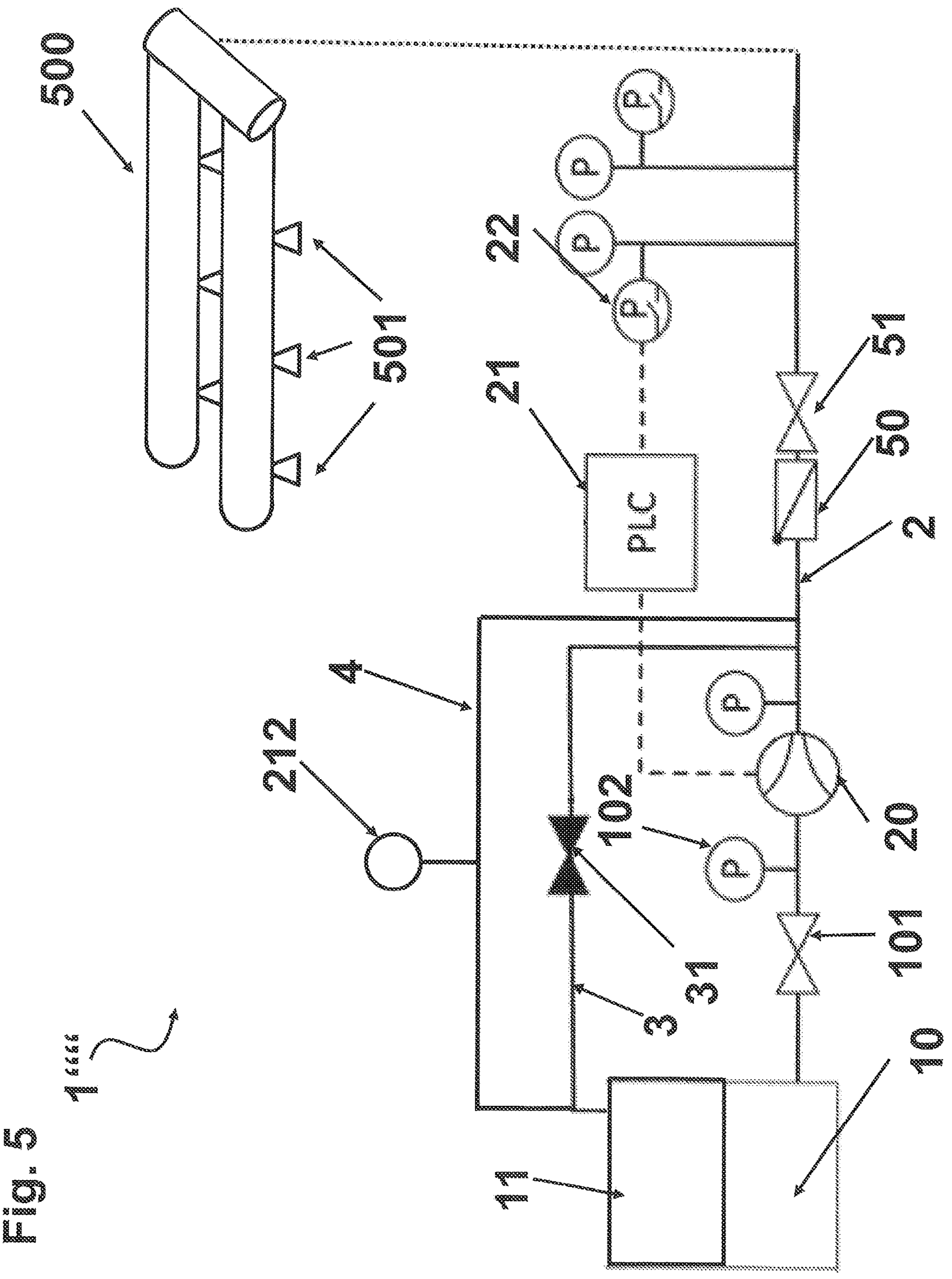
FIG. 5 is a schematic diagram of a water extinguishing system according to yet another embodiment.

FIG. 5 shows a water extinguishing system 1'''' according to yet another preferred embodiment. The arrangement of the water extinguishing system 1'''' corresponds to that of the water extinguishing system 1''' of FIG. 4 with regard to the sensors and its operating principle, with the difference that the fluid bypass line 4 in the water extinguishing system 1'''' of FIG. 5 branches off from the supply line 2 in order to conduct the extinguishing fluid around the shut-off element 31 of the test line 3 away from the pipe system 500. The arrangement of the fluid bypass line 4 changed in this way does not affect the pump test run described above in connection with FIG. 4. It should be understood in this regard that the water extinguishing systems 1, 1' and 1" of FIGS. 1, 2 and 3 may also be equipped with a design of the fluid bypass line 4 according to FIG. 5 without affecting the general operating principle of the water extinguishing systems 1, 1' and 1" and the corresponding pump test runs.

A combination of the sensor arrangements and/or designs of the fluid bypass line 4 and/or the test line 3 according to the exemplary embodiments of FIGS. 1 to 5 is also conceivable. For example, a combination of a temperature sensor in the vicinity of the pump 20 with a pressure difference sensor at the fluid bypass line 4 may be used to ensure improved monitoring of the pump test run. This combination may also be combined with a flow sensor at the fluid bypass line 4 and/or a vibration sensor at the pump 20 and/or a noise sensor at or in the vicinity of the pump 20 to improve monitoring even further. Other combinations which are immediately apparent to the person skilled in the art after studying the above description are also provided according to the invention.

LIST OF UTILIZED REFERENCE NUMBERS

1, 1', 1", 1'", 1"" water extinguishing system
10 fluid supply tank
11 fluid reservoir
101 first shut-off valve
102 pressure indicator
2 supply line
20 pump
21 pump control
22 pressure switch for pump control
23 temperature sensor
211 control unit
212 switching arrangement
3 test line
31 opening element
4 fluid bypass line
41 flow sensor
42 differential pressure sensor
43 first position
44 second position
50 non-return valve
51 second shut-off valve
500 pipe system
501 sprinkler

What is claimed is:

1. A method for controlling a pump test run for a pump of a water extinguishing system, wherein the method comprises the following steps:

providing a fluid bypass line having a reduced cross-section compared with a test line branching off from a supply line of a pipe system, wherein the fluid bypass line is configured to conduct a predefined portion of an extinguishing fluid around an opening element of the test line away from the pipe system, determining at least one parameter indicative of the cross-section of the fluid bypass line, and controlling, based on the at least one parameter, the pump test run of the pump.

2. The method of claim 1, wherein the determining at least one parameter comprises:

establishing a threshold value for the at least one parameter which corresponds to a sufficiency to perform the pump test run of the pump; and comparing an actual value of the at least one parameter to the threshold value.

3. The method of claim 2, wherein the threshold value is determined based on a pump type and a pump category.

4. The method of claim 3, wherein the determining of the at least one parameter further comprises:

monitoring at least one sensor to determine the actual value of the at least one parameter;

wherein the at least one sensor consists of a temperature sensor, at least one pressure sensor, a noise sensor, a vibration sensor, a flow sensor, or any combination thereof.

5. The method of claim 4, wherein controlling the pump test run of the pump further comprises:

arranging the temperature sensor in a vicinity of the pump, wherein the at least one parameter is indicative of a temperature of the extinguishing fluid in the vicinity of the pump;

beginning the pump test run based on an indication that the actual value of the at least one parameter is below the threshold value; and aborting the pump test run based on an indication that the actual value of the at least one parameter exceeds the threshold value.

6. The method of claim 4, wherein controlling the pump test run of the pump further comprises:

arranging a first pressure sensor of the at least one pressure sensor at a first end of the fluid bypass line and a second pressure sensor of the at least one pressure sensor at a second end of the fluid bypass line, wherein the at least one parameter is indicative of a pressure change of the extinguishing fluid within the fluid bypass line;

beginning the pump test run based on an indication that the actual value of the at least one parameter exceeds the threshold value; and aborting the pump test run based on an indication that the actual value of the at least one parameter is below the threshold value.

7. The method of claim 4, wherein the controlling the pump test run of the pump further comprises:

arranging the noise sensor to detect a change in noise output of the pump, wherein the at least one parameter is indicative of a noise level that corresponds to an amount of cavitation or deposits within the fluid bypass line;

beginning the pump test run based on an indication that the actual value of the at least one parameter is below the threshold value; and aborting the pump test run based on an indication that the actual value of the at least one parameter exceeds the threshold value.

8. The method of claim 4, wherein controlling the pump test run of the pump further comprises:

arranging the vibration sensor to detect a change in oscillation of the pump, wherein the at least one parameter is indicative of a vibration level that corresponds to an amount of cavitation or deposits within the fluid bypass line;

beginning the pump test run based on an indication that the actual value of the at least one parameter is below the threshold value; and aborting the pump test run based on an indication that the actual value of the at least one parameter exceeds the threshold value.

9. The method of claim 4, wherein the controlling the pump test run of the pump further comprises:

arranging the flow sensor in a vicinity of the pump, wherein the at least one parameter is indicative of a flow rate in the fluid bypass line;

beginning the pump test run based on an indication that the actual value of the at least one parameter exceeds the threshold value; and aborting the pump test run based on an indication that the actual value of the at least one parameter is below the threshold value.

10. The method of claim 4, wherein the controlling the pump test run of the pump further comprises:

providing at least one control device configured to control the pump test run based on the value of the at least one parameter.

11. The method of claim 10, wherein the pump test run is remotely controlled using the at least one control device.

12. The method of claim 10, wherein the control device includes an energy storage device that allows the control device to control the pump when an energy failure occurs.

13. The method of claim 12, wherein the controlling the pump test run of the pump further comprises:

aborting the pump test run when the energy failure occurs, wherein aborting the pump test run conserves energy stored in the energy storage device allowing the pump to be activated when a fire event is detected.

14. The method of claim 4, wherein the controlling the pump test run of the pump comprises:

receiving an indication that a fire event is detected; and continuing to run the pump after completion of the pump test run to extinguish the fire event.

15. The method of claim 4, wherein the controlling the pump test run of the pump further comprises:

performing the pump test run at regular time intervals.

16. The method of claim 4, wherein the cross-section of the fluid bypass line is 5% of the cross-section of the test line.

17. The method of claim 1, wherein the cross-section of the fluid bypass line is 2% of the cross-section of the test line.

* * * * *